United States Patent
Lin et al.

(10) Patent No.: US 7,877,741 B2
(45) Date of Patent: Jan. 25, 2011

(54) METHOD AND CORRESPONDING APPARATUS FOR COMPILING HIGH-LEVEL LANGUAGES INTO SPECIFIC PROCESSOR ARCHITECTURES

(75) Inventors: Tay-Jyi Lin, Hsinchu (TW); Chie-Min Chao, Hsinchu (TW); Chih-Wei Liu, Hsinchu (TW); Chein-Wei Jen, Hsinchu (TW); I-Tao Liao, Hsinchu (TW); Po-Han Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1263 days.

(21) Appl. No.: 11/246,126

(22) Filed: Oct. 11, 2005

(65) Prior Publication Data

US 2006/0248262 A1 Nov. 2, 2006

(30) Foreign Application Priority Data

Apr. 29, 2005 (TW) .............................. 94114040 A

(51) Int. Cl.
G06F 9/45 (2006.01)
G06F 9/445 (2006.01)

(52) U.S. Cl. ....................................... 717/148; 717/154
(58) Field of Classification Search ......... 717/140–148, 717/150–154
See application file for complete search history.

(56) References Cited

U.S. PATENT DOCUMENTS

| | | | | |
|---|---|---|---|---|
| 5,182,806 A * | 1/1993 | McKeeman et al. | ......... | 717/145 |
| 5,392,448 A | 2/1995 | Frankel et al. | | |
| 5,787,287 A * | 7/1998 | Bharadwaj | .................. | 717/144 |
| 5,937,193 A * | 8/1999 | Evoy | ......................... | 717/140 |
| 6,035,123 A * | 3/2000 | Razdan et al. | .............. | 717/155 |
| 6,112,317 A * | 8/2000 | Berc et al. | .................... | 714/47 |
| 6,453,465 B1 | 9/2002 | Klein | | |
| 6,658,655 B1 * | 12/2003 | Hoogerbrugge et al. | ..... | 717/139 |
| 6,698,015 B1 * | 2/2004 | Moberg et al. | ............. | 717/154 |
| 6,708,325 B2 | 3/2004 | Cooke et al. | | |
| 6,832,369 B1 * | 12/2004 | Kryka et al. | ................ | 717/140 |
| 6,971,091 B1 * | 11/2005 | Arnold et al. | ............... | 717/145 |
| 6,973,644 B2 * | 12/2005 | Nylander et al. | ............ | 717/139 |
| 7,103,881 B2 * | 9/2006 | Stone | ......................... | 717/148 |

(Continued)

FOREIGN PATENT DOCUMENTS

TW 525091 B 3/2003

(Continued)

OTHER PUBLICATIONS

Berndl et al, "Context threading a flexible and efficient dispatch technique for virtual machine interpretres", IEEE CGO, pp. 1-12, 2005.*

(Continued)

*Primary Examiner*—Anil Khatri
(74) *Attorney, Agent, or Firm*—Tim Tingkang Xia; Morris, Manning & Martin, LLP

(57) ABSTRACT

A method and corresponding apparatus for compiling high-level languages into specific processor architectures are provided. In this embodiment, the specific processor is encapsulated in a virtual processor interface with simple instruction set architecture, and a compiler translates application programs into corresponding assembly codes. Further, the difficulty of the compiler design is reduced.

16 Claims, 12 Drawing Sheets

U.S. PATENT DOCUMENTS

| | | | |
|---|---|---|---|
| 7,168,069 B1 * | 1/2007 | Sigmund | 717/140 |
| 7,188,339 B2 * | 3/2007 | Qureshi | 717/140 |
| 7,210,135 B2 * | 4/2007 | McCrady et al. | 717/140 |
| 7,290,253 B1 * | 10/2007 | Agesen | 717/154 |
| 7,296,261 B2 * | 11/2007 | Witchel et al. | 717/136 |
| 7,367,015 B2 * | 4/2008 | Evans et al. | 717/110 |
| 7,367,023 B2 * | 4/2008 | Adolphson et al. | 717/153 |
| 7,512,616 B2 * | 3/2009 | Corcoran et al. | 707/101 |
| 7,779,394 B2 * | 8/2010 | Homing et al. | 717/136 |

FOREIGN PATENT DOCUMENTS

| | | |
|---|---|---|
| TW | 569138 B | 1/2004 |
| TW | 575827 B | 2/2004 |

OTHER PUBLICATIONS

Tsafrir et al, "Minimizing dependencies within generic classes for faster and smaller programs", ACM OOPSLA, pp. 425-444, 2009.*

Suganuma et al, "A region based compilation technique for dynamic compilers", ACM Trans. on Prog. Lang. and Sys., vol. 28, No. 1, pp. 134-174, 2006.*

Klein et al, "A machine checked model for Java like langugae, virtual machine and compiler", ACM Trans. on Prog. Lang. and Sys. vol. 28, No. 4, pp. 619-695, 2006.*

Anton Chernoff, et al.,"Digital FX!32 Running 32-Bit x86 Applications on Alpha NT." Aug. 1997.

* cited by examiner

METHOD AND CORRESPONDING APPARATUS FOR COMPILING HIGH-LEVEL LANGUAGES INTO SPECIFIC PROCESSOR ARCHITECTURES

CROSS REFERENCE TO RELATED APPLICATIONS

This Non-provisional application claims priority under 35 U.S.C. §119(a) on Patent Application No(s). 94114040 filed in Taiwan on Apr. 29, 2005, the entire contents of which are hereby incorporated by reference.

BACKGROUND

1. Field of Invention

The invention relates to a high-level language compiling system for a processor, particularly to a method and corresponding apparatus for compiling high-level languages into specific processor architectures.

2. Related Art

Since most multimedia and communication systems are developed in high-level program languages (such as C/C++), developers are capable of transforming the same program codes onto different platforms simply by utilizing a compiler's automatic program code generating mechanism, thereby significantly reducing the time course for the product development. However, because of the increasing demand of high efficiency and low power, the digital signal processor which performs computation in the system is usually incorporated with many particular designs for various application fields, e.g., the addition of exclusive register files with particular access restriction, program flow control mechanisms with low overhead (such as hardware looping and conditional execution) and acceleration instructions for particular application fields, resulting in increasing difficulties and complexities of the compiler design, and thereby the platform transformation becomes more difficult.

Referring to FIG. 1, for example, the architecture of a digital signal processor, Packed Instructions & Clustered Architecture (PICA), is shown. The PICA digital signal processor 100 is a very long instruction set (VLIW) of a 2-way instruction slot (i.e. load/store unit 120 and arithmetic unit 122), wherein the register file (i.e. address register file 112 and accumulator 114) has a distributed architecture and employs a particular ping-pong operation mode to facilitate the data exchange between different register files (i.e. using a pair of ping and pong register files 110 to save the input and output data during data processing and transmission). In this case, a zero-overhead looping mechanism and conditional execution are provided for the program flow. However, due to various functions described above, the compiler is rather complex in respect of the design of the program codes automatic generation.

At present, the common solutions are as follows.

Referring to FIG. 2, a virtual machine 210 (e.g. a java virtual machine; JVM) is used to define a virtual architecture 220, i.e. to define a virtual processor architecture and a corresponding instruction set. Then a compiler 240 is used to compile the application program 230 into a binary bytecode 250 based on the virtual architecture 220, and then during execution, an interpreter 260 translates the bytecode 250 into a machine code 270 (i.e. a binary code) executable for the physical processor 280. Herein, when a bottom level physical processor 280 is to be altered, only the corresponding interpreter 260 is required to be re-written without the need to recompile the application program 230, and the same bytecode 250 may be reused. However, when the architecture is used to compile a high-level language application program, the generated code is hard to optimize for the physical processor architecture. Moreover, multilevel translation mechanism leads to significant efficiency reduction to the application program Referring to FIG. 3, an abstract function interface 310 of the high-level language independent from the hardware is provided, so that in the application program 230, the desired algorithm is completed by directly linking the functions from the interface function library 320, no need for considering the true action and restrictions on computation of the processor 280. Furthermore, for different physical processors 280, only different interface function libraries 320 are required to be re-linked by the compiler 240 without rewriting the original application program 230 written in high-level languages. However, while the architecture initially uses the abstract function interface 310, the original application program 230 is required to be rewritten to comply with the action defined by its function library 320. As a result, it is rather time consuming, and in practical operation, an operating system 390 is needed for assisting the operations of the abstract function interface 310 and the physical processor 280. Moreover, the function library 320 provided under this architecture is insufficient to perform all functions provided by the physical processor 280.

In another method, the machine codes of the application programs compiled into different processor architectures are recompiled into the binary codes executable for the physical processor by using the software in a dynamic (i.e. during executing) or static manner. However, since it is hard for the architecture to acquire the relationships between the instructions in a large scale while recompiling conducted by the software, the optimization is rather limited. Meanwhile, due to the differences between the architectures of the processors, the translated program codes cannot sufficiently use the computation capability of the physical processor, thereby resulting in a low efficiency of the application programs.

Thus it is understood that base upon the actual hardware architecture technique, it is no longer difficult to develop a novel processor architecture with high efficiency, and the key factor to define the popularity in the market is whether there is a high-level language compiling system in the development environment. Moreover, for the purpose of greatly shortening the time course of the processor development and verification, it is indispensable to develop a useful compiler for the novel processor rapidly in the early development time.

SUMMARY

In view of the problems described above, the primary object of the present invention is to provide a method and corresponding apparatus for compiling high-level languages into specific processor architectures, thereby substantially solving the problems in the prior art.

The method and corresponding apparatus for compiling high-level languages into specific processor architectures of the present invention reduce the difficulty of the compiler development.

In terms of the method and corresponding apparatus for compiling high-level languages into specific processor architectures of the present invention, a few of additional hardware are incorporated into the existing specific processor in corporation with simple software tools, so as to simplify the development of the compiler.

Therefore, to achieve the above objects, the present invention discloses a method for compiling high-level languages into specific processor architectures including: providing a virtual instruction set; acquiring an application program; translating the application program into corresponding assembly codes based on the virtual instruction set to obtain a first assembly code; defining a key instruction block within the first assembly code; and replacing the key instruction block with corresponding assembly codes in a specific manner to obtain a second assembly code.

The key instruction block includes an instruction portion, using particular functions of the highly parallel computation core and physical process block, and the key instruction block is defined by the general program feature analysis and profiling tool, and further replaced by other hand-crafted codes, or linked to a function library, so that the assembly codes for replacing are generated by functions from the function library.

The virtual processor interface is structured outside the physical process block to provide a virtual instruction set. Furthermore, exclusive computation resources are not included in the virtual processor interface.

The present invention further discloses an apparatus for compiling high-level languages into specific processor architectures, which is used for compiling an application program into an assembly code, including: a physical process block, a virtual processor interface, and a compiler. The virtual processor interface is structured outside the physical process block to provide a virtual instruction set and the compiler related to the virtual processor interface translates the application program into its corresponding assembly codes based on the virtual instruction set.

Moreover, for the purpose of efficiently executing the translated programs, the key instruction block is defined from the resulting assembly codes, and the defined key instruction block is then replaced in a specific manner.

The key instruction block comprises an instruction portion which uses particular functions of the highly parallel computation core and physical process block, wherein the key instruction block is defined by the general program feature analysis and profiling tool, and the defined key instruction block is further replaced by other hand-crafted codes, or linked to a function library, so that the assembly codes for replacing are generated by functions from the function library.

Herein, the compiler employed is the one that supports the processor equivalent to the virtual processor interface.

Furthermore, the physical process block is specific processor architecture such as a digital signal processor (DSP) architecture, and the virtual processor interface is a reduced instruction set computer (RISC) processor architecture.

Further details and properties of the present invention will become apparent from the detailed description given hereinafter and the accompanying drawings.

BRIEF DESCRIPTION OF THE DRAWINGS

The invention will become more fully understood from the detailed description given herein below illustration only, and thus are not limitative of the present invention, and wherein.

DETAILED DESCRIPTION

Figure 1:
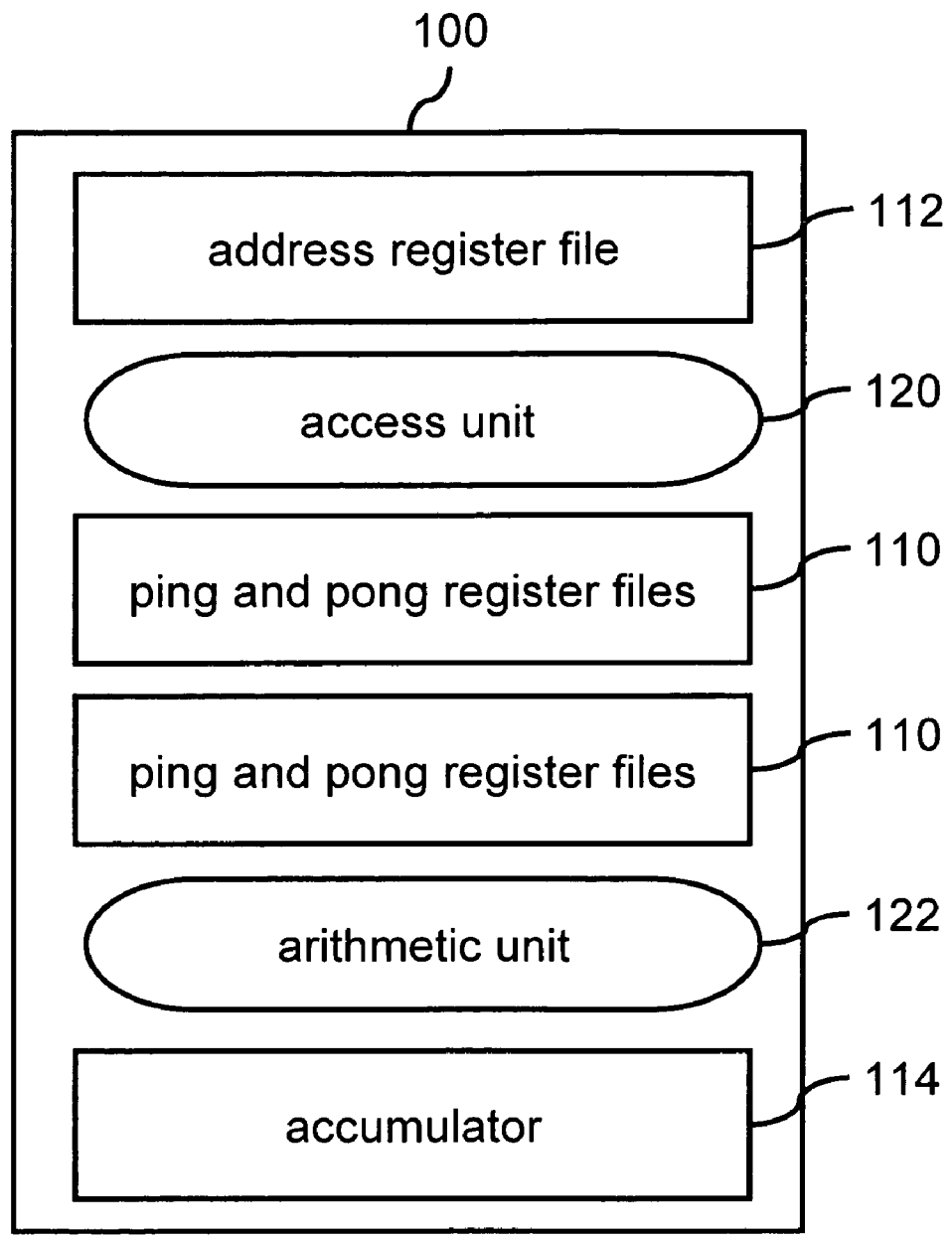
FIG. 1 is a schematic view of a digital signal processor of the conventional art.
Figure 2:
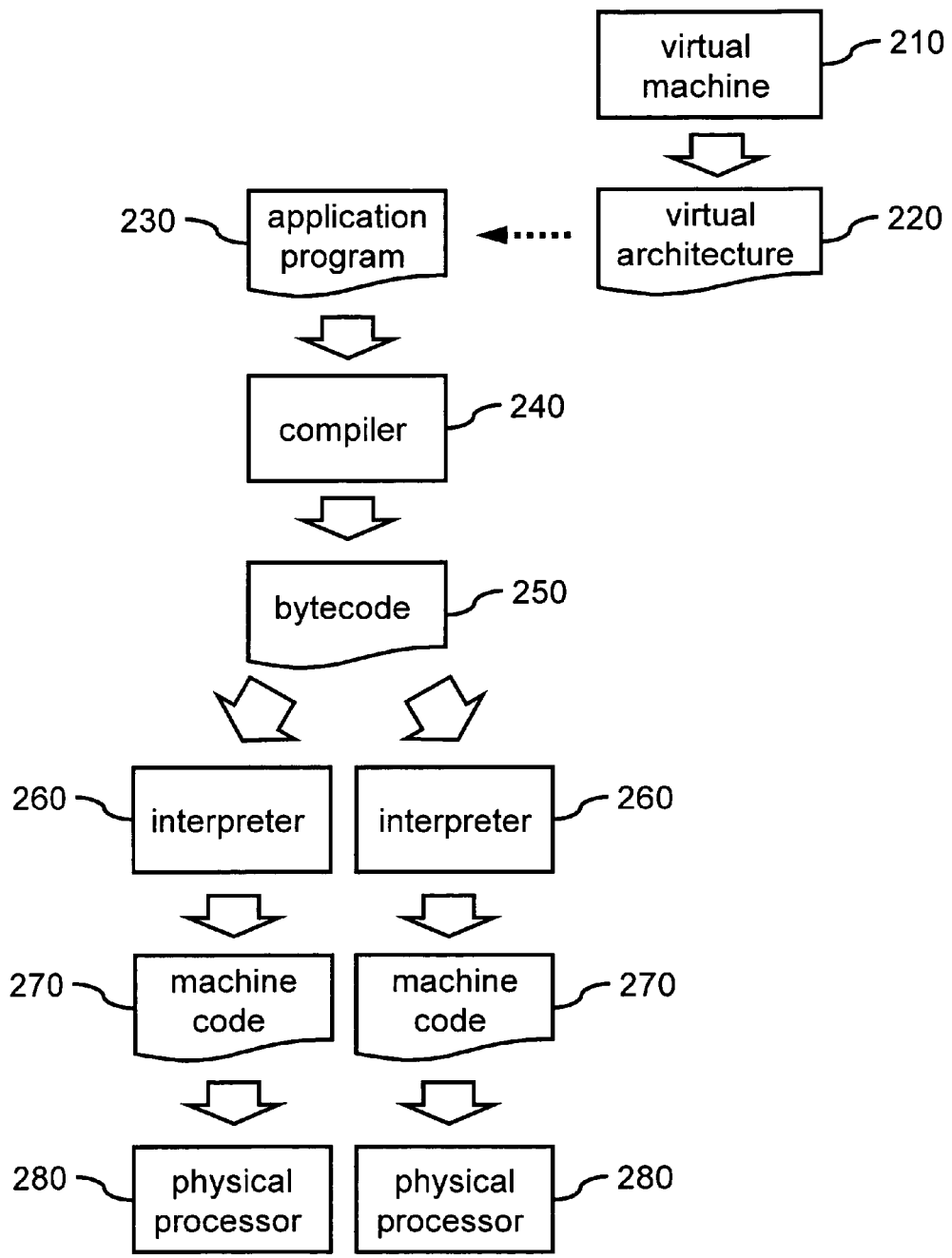
FIG. 2 is a schematic view of a high-level language compiling architecture of the conventional art.
Figure 3:
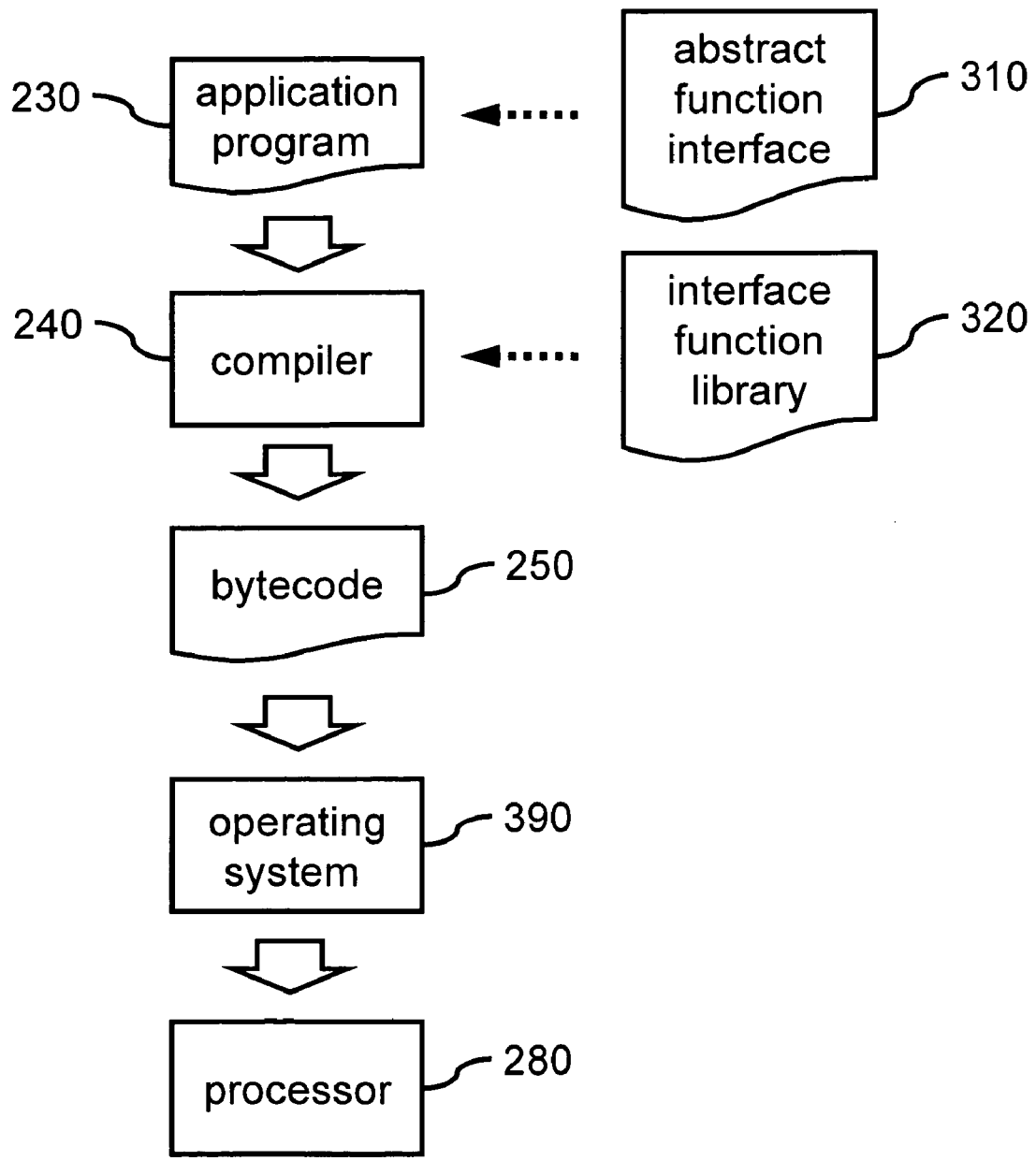
FIG. 3 is a schematic view of a high-level language compiling architecture of the conventional art.

The main inventive concepts of the present invention are illustrated firstly. The present invention is primarily to provide a virtual processor interface to reduce the difficulty in the compiler design. For the practical hardware configurations, the virtual processor interface does not need the exclusive computing resources, but a few of hardware are added so as to translate the operation of the virtual processor interface into the computation of the physical processor. Wherein the architecture principle of the virtual processor interface is to build a simple instruction set architecture (ISA), and to provide a general register file without access restrictions, and furthermore, to simplify the control mechanism of the program flow, so that the compiler easily translates the application programs into corresponding assembly codes.

The content of the present invention will be illustrated in detail with the specific embodiments with reference to the accompanying drawings. The numerals mentioned in the specification refer to the reference numerals of the drawings.

Figure 4:
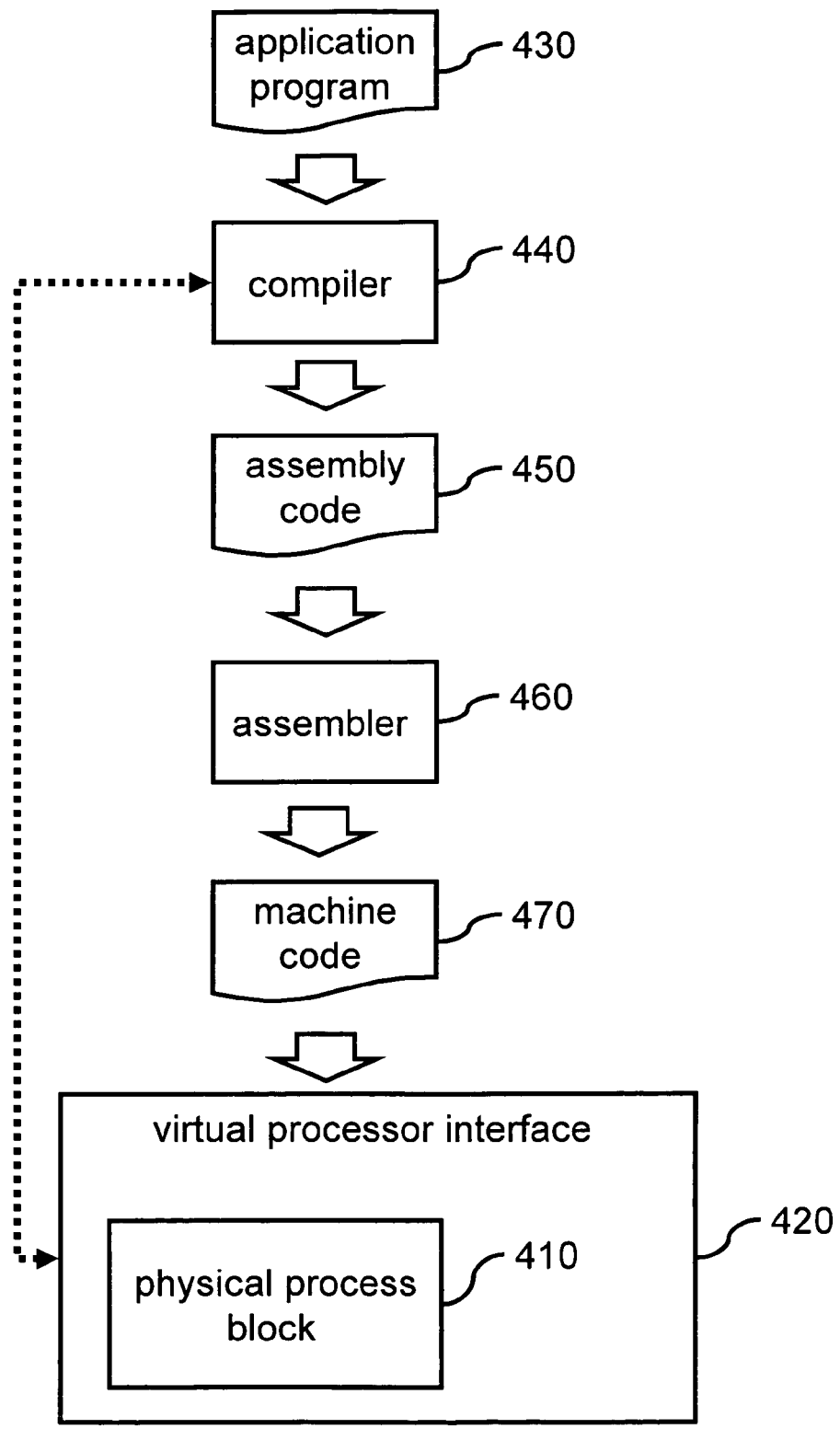
FIG. 4 is a schematic view of a high-level language compiling architecture in accordance with an embodiment of the present invention.
Figure 5:
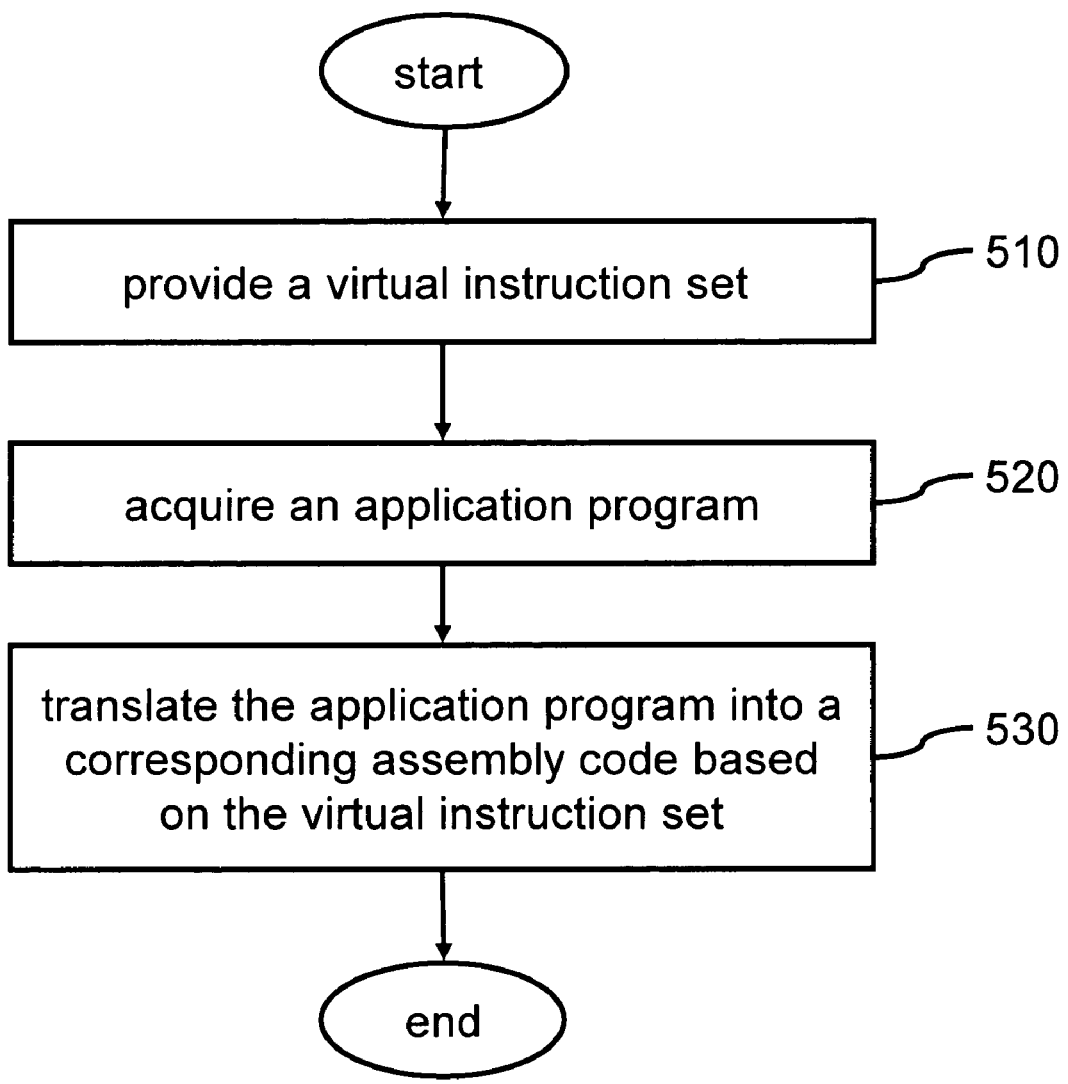
FIG. 5 is a flow chart of a high-level language compiling architecture in accordance with an embodiment of the present invention.

Referring to FIG. 4 and FIG. 5, a physical process block 410 is encapsulated in a virtual processor interface 420 to provide a virtual instruction set (step 510); then an application program 430 is acquired (step 520); the application program 430 is translated into the corresponding assembly codes by a compiler 440 depending on the virtual processor interface 420, to obtain a first assembly code 450 (step 530), wherein the compiler employed is the one that supports the processor equivalent to the virtual processor interface.

Figure 6:
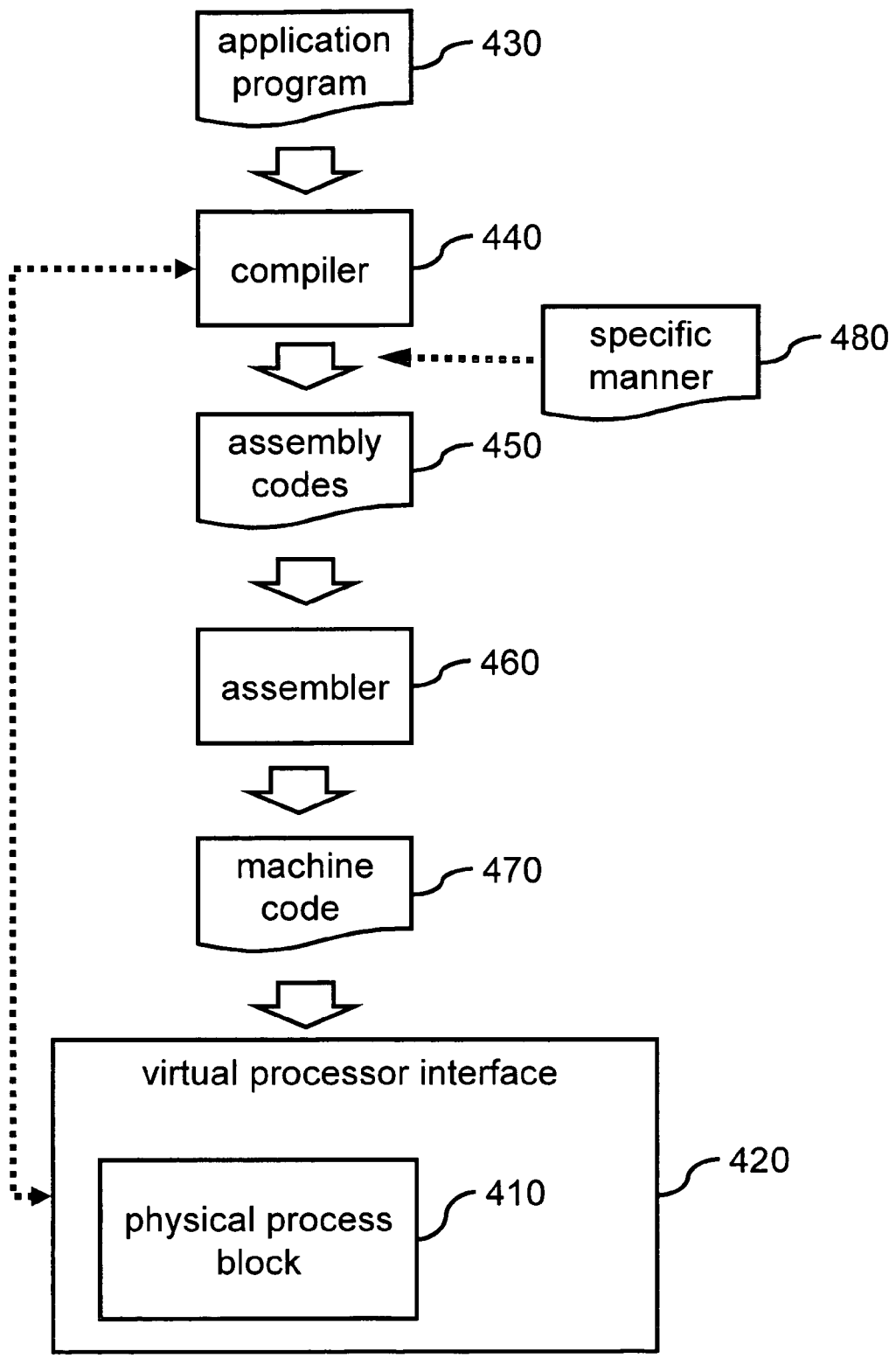
FIG. 6 is a schematic view of a high-level language compiling architecture in accordance with another embodiment of the present invention.
Figure 7:
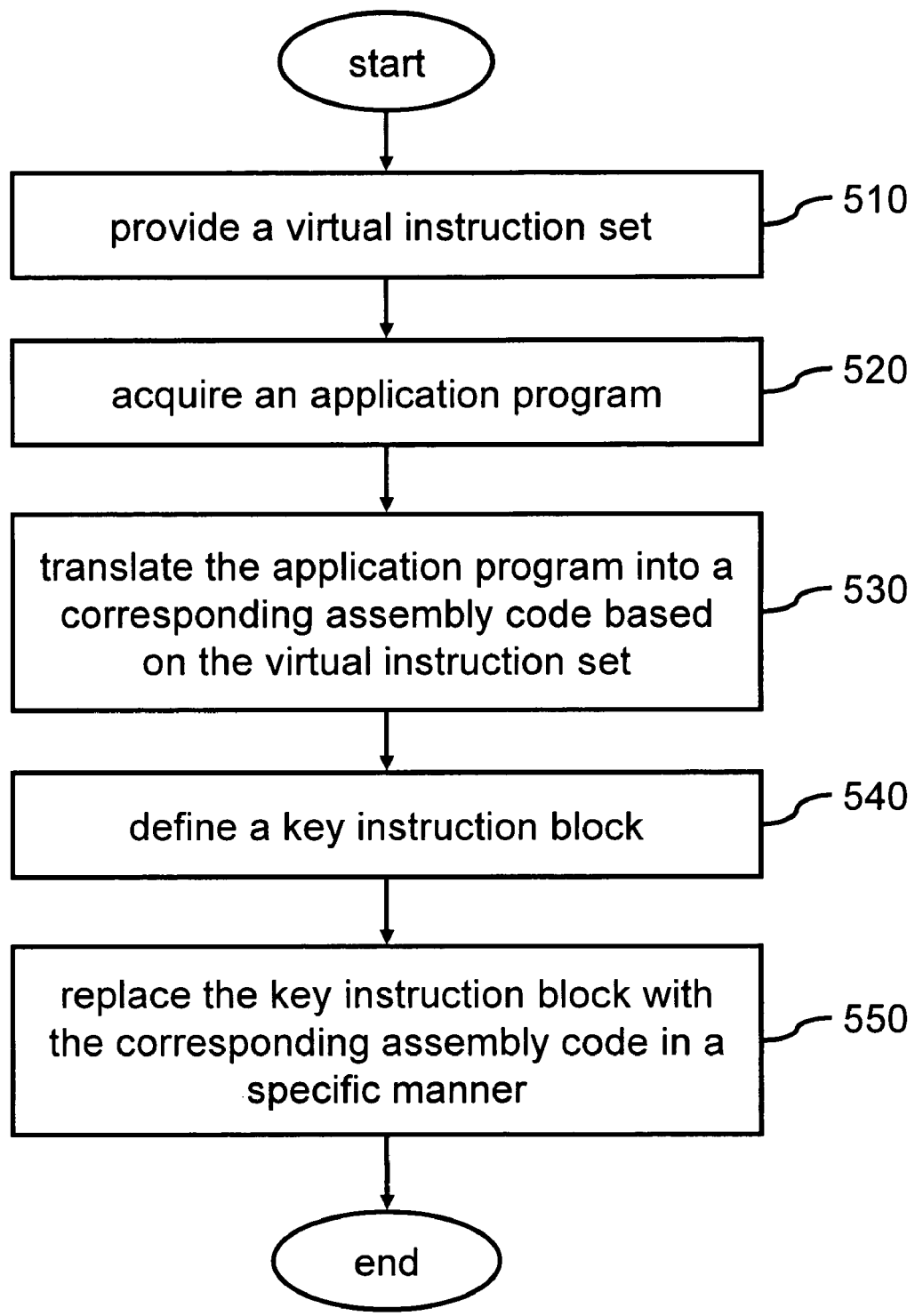
FIG. 7 is a flow chart of a high-level language compiling architecture in accordance with another embodiment of the present invention.

Moreover, in order to efficiently execute the translated programs, a key instruction block is defined from the first assembly codes (step 540), and then the key instruction block is replaced in a specific manner 480, so that a second assembly code 450 (step 550) is obtained, as shown in FIG. 6 and FIG. 7.

Herein, the key instruction block includes an instruction portion, using particular functions of highly parallel computation core and physical process block, and the key instruction block is defined by the general program feature analysis and profiling tool, and then further replaced by other hand-crafted codes, or linked to a function library so that the assembly codes for replacing are generated by functions from the function library.

Figure 8:
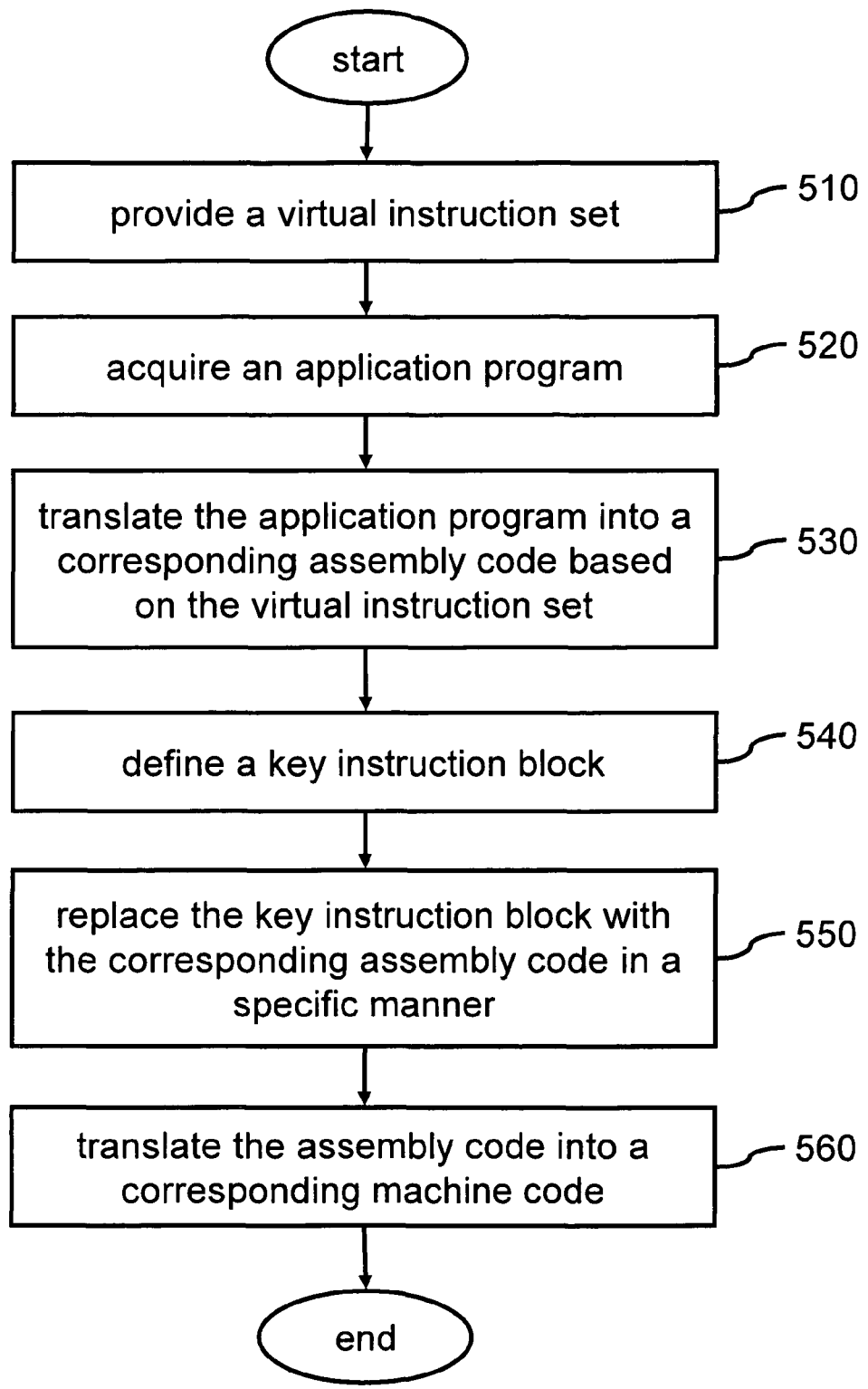
FIG. 8 is a flow chart of a high-level language compiling architecture in accordance with still another embodiment of the present invention.

Before execution, an assembler 460 is used to translate assembly codes into the corresponding machine codes 470 (step 560), wherein the assembler is the one that corresponds to the original physical process block, as shown in FIG. 6 and FIG. 8.

Figure 9:
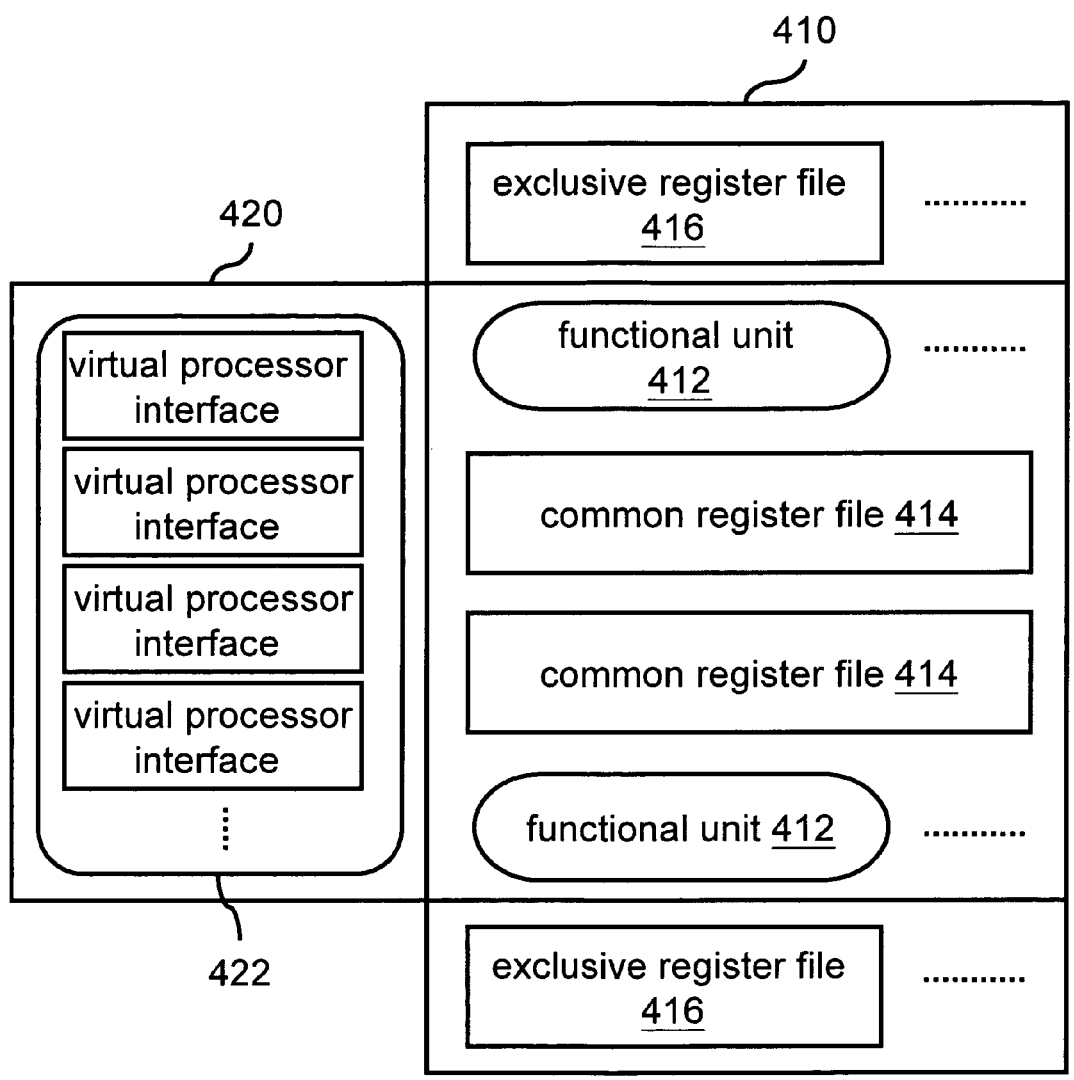
FIG. 9 is a general block diagram illustrating an embodiment of an integral architecture of a physical process block and a virtual processor interface in FIG. 4 and FIG. 6.

Herein, the physical process block 410 is a digital signal processor (DSP) architecture, and this virtual processor interface 420 is a reduced instruction set computer (RISC) architecture. The digital signal processor architecture includes multiple instruction slots (i.e. functional unit 412), a common register file 414 and multiple exclusive register files 416. While the RISC architecture includes a general register unit 422 having a plurality of register files. Herein, the virtual processor interface 420 shares the hardware resources (i.e. the block portion in grey) of the physical process block 410, as shown in FIG. 9. Herein, the virtual processor interface 420 is provided with two data register files therein, which use simple wiring mechanism to correspond to the common register files 414 of the physical process block 410.

When the instruction is practically executed, the physical process block provides an additional decoding mechanism for instruction morphing, so that when decoded, the virtual instructions may be replaced with the physical instructions with the same functions on the physical process block. However, if the physical instructions with the same functions are not available, computation is performed by using the original hardware resources, and the desired register files directly share the original register files utilizing the aliasing mechanism.

Figure 10:
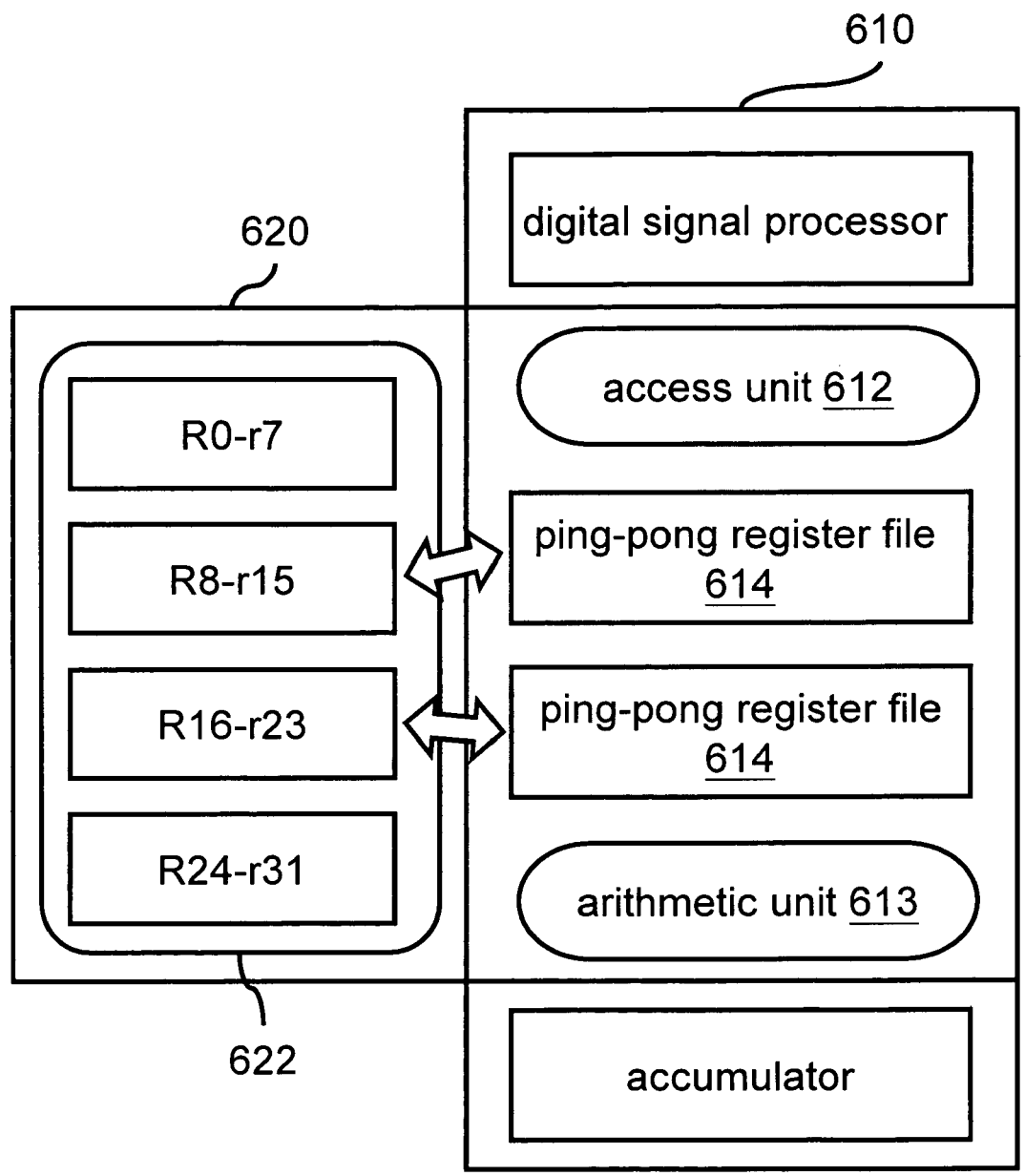
FIG. 10 is a general block diagram illustrating another embodiment of an integral architecture of a physical process block and a virtual processor interface.

For example, referring to FIG. 10, a virtual RISC processor interface 620 outside is incorporated into the digital signal processor 610 of a very long instruction set (VLIW) of a 2-way instruction slot (such as the access unit 612 and the arithmetic unit 613 as shown). Therefore, the original digital signal processor is regarded as a processor that is compatible with the RISC processor on the instruction level. In this embodiment, a scalar unit 622 is additionally provided, which includes 32 general registers, wherein register files r8-r15 and r16-r23 with the serial numbers of 8-15 and 16-23 respectively correspond to the ping-pong register files 614 (i.e. ping and pong register files) within the digital signal processor 610 utilizing the simple wiring mechanism, while additional hardware resources are incorporated into the register files r0-r7 and r24-r31 with the serial numbers of 0-7 and 24-31 for the purpose of supporting (not shown). When the instruction is practically executed, the additional decoding mechanism within the digital signal processor translates the virtual instructions of the RISC processor into physical instructions with the same functions and thus the original computing resources (i.e. block portion in grey) could be shared.

Figure 11:
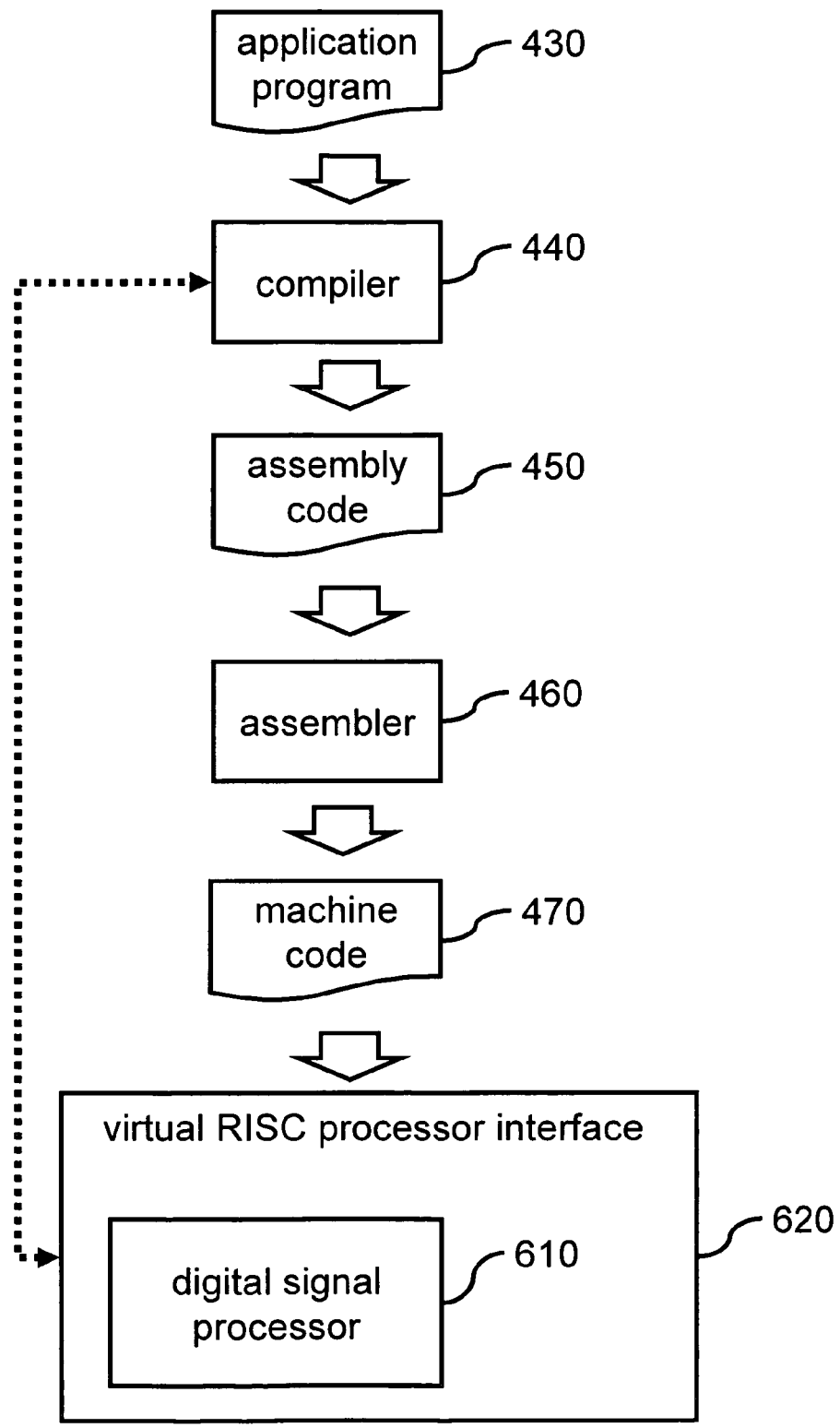
FIG. 11 is a schematic view illustrating an embodiment of a high-level language compiling architecture applied in an integral architecture of FIG. 10.
Figure 12:
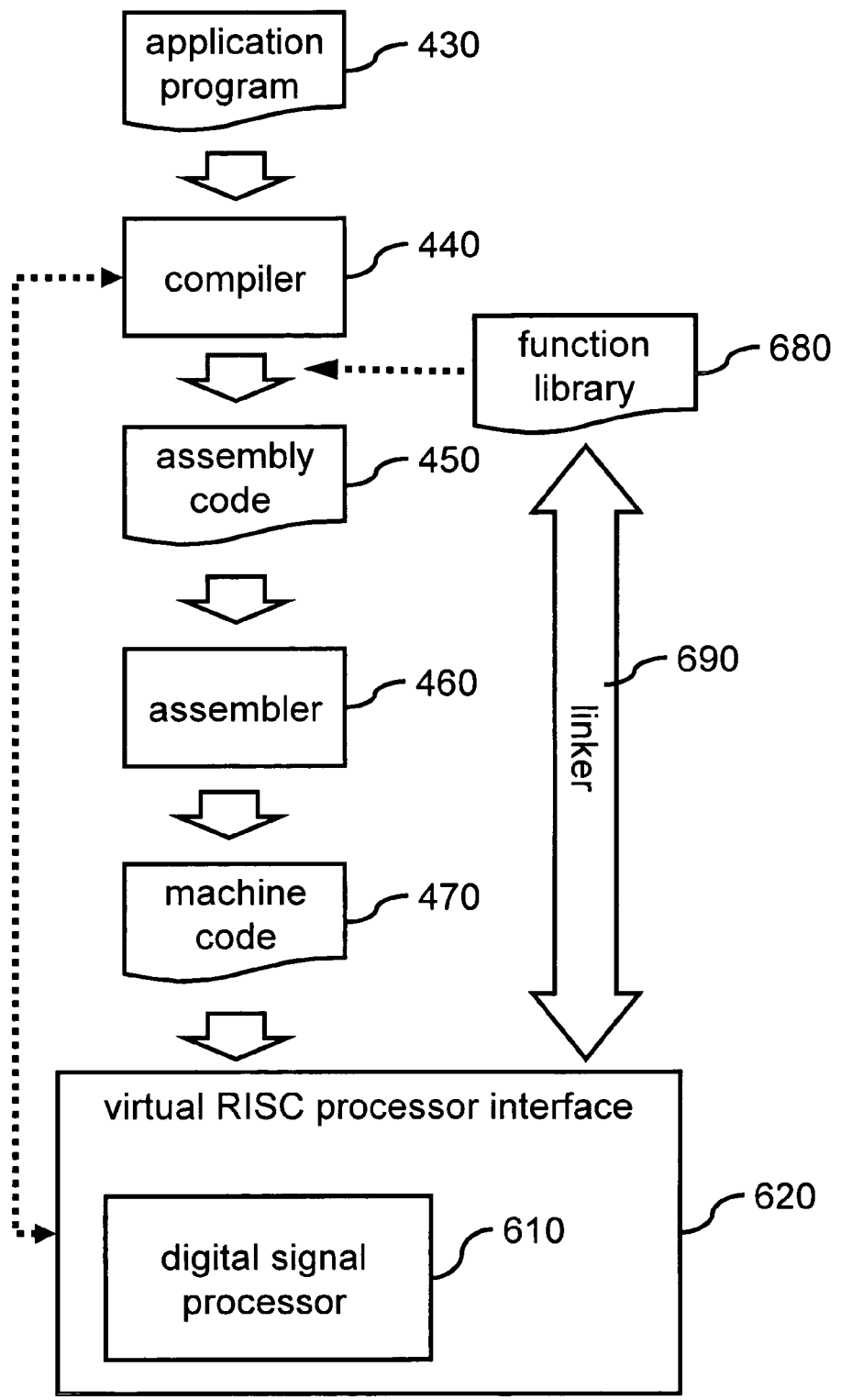
FIG. 12 is a schematic view illustrating another embodiment of a high-level language compiling architecture applied in an integral architecture of FIG. 10.

For the program auto-generating part, an improved digital signal processor 610 may be regarded as a RISC processor. As long as a compiler 440 that supports the RISC processor is chosen, the desired application program 430 may be translated to the assembly codes 450 of the RISC processor without redesigning or modifying the compiler 440. While the translated assembly codes 450 then uses the assembler 460 corresponding to the original digital signal processor to translate them into the machine codes 470, as shown in FIG. 11. Where an external function library 680 is used, it is linked to virtual RISC processor interface 620 with the linker 690, as shown in FIG. 12.

While the invention has been described with respect to the above-preferred embodiments which however are not intended to limit the invention, it is apparent for those skilled in the art that many variations and modifications can be made without departing from the spirit and scope of the invention. The scope of the present invention shall be defined as in the appended claims.

What is claimed is:

1. A method for compiling high-level languages into specific processor architectures, suitable for a specific processor, comprising the steps of:
    providing a virtual instruction set;
    acquiring an application program;
    translating the application program into a corresponding assembly code based on the virtual instruction set to obtain a first assembly code;
    defining at least one key instruction block within the first assembly code; and
    replacing the key instruction block with a corresponding assembly code in a specific manner to obtain a second assembly code;
wherein the step of replacing the key instruction blocks with a corresponding assembly codes in a specific manner comprising the steps of:
    linking a function library, wherein the function library comprises a plurality of functions;
    calling the functions to generate the corresponding assembly codes; and
    replacing the key instruction blocks with the corresponding assembly codes;
    after obtaining the second assembly code, translating the second assembly code into a machine code for the specific processor.

2. The method for compiling high-level languages of claim 1, wherein the step of replacing the key instruction blocks with a corresponding assembly codes in a specific manner comprises the step of: replacing the key instruction blocks with a plurality of hand-crafted codes.

3. The method for compiling high-level languages of claim 1, wherein the step of defining at least one key instruction block within the first assembly code comprises the step of: defining the key instruction block by utilizing a general program feature analysis and profiling tool.

4. The method for compiling high-level languages of claim 1, wherein the key instruction block is executed by a highly parallel computation core.

5. A method for compiling high-level languages into specific processor architectures, suitable for a specific processor, comprising the steps of:
    structuring a virtual processor interface outside a physical process block;
    acquiring an application program; translating the application program into a corresponding assembly codes based on the virtual processor interface to obtain a first assembly code;
    defining at least one key instruction block within the first assembly code; and
    replacing the key instruction block by a corresponding assembly code in a specific manner to obtain a second assembly code,
wherein the step of replacing the key instruction block by a corresponding assembly code in a specific manner comprising the steps of:
    linking a function library, wherein the function library includes a plurality of functions.
    calling the functions to generate the corresponding assembly code; and
    replacing the key instruction block by the corresponding assembly code;

after obtaining the second assembly code, translating the second assembly code into a machine code for the specific processor.

6. The method for compiling high-level languages of claim 5, wherein the step of replacing the key instruction block by a corresponding assembly code in a specific manner comprises the step of: replacing the key instruction block by a plurality of hand-crafted codes.

7. The method for compiling high-level languages of claim 5, wherein the step of translating the second assembly code into a machine code comprises the step of: translating the second assembly code into the machine code by utilizing an assembler corresponding to the physical process block.

8. The method for compiling high-level languages of claim 5, wherein the step of translating the application program into the corresponding assembly codes based on the virtual processor interface comprises the step of: translating the application program into the corresponding assembly codes by utilizing an assembler that supports the virtual processor interface.

9. The method for compiling high-level languages of claim 5, wherein the key instruction block is executed by a highly parallel computation core.

10. An apparatus for compiling high-level languages into specific processor architectures, suitable for a specific processor, to compile an application program into a translated assembly code, comprising:
   a physical process block;
   a virtual processor interface, structured on the physical process block, for providing a virtual instruction set;
   a compiler, related to the virtual processor interface, for translating the application program into a corresponding assembly code based on the virtual instruction set to obtain the translated assembly code; and
   a function library, including a plurality of functions and linked to the compiler,
   wherein the compiler calls the functions to generate at least one assembly code corresponding to the key instruction block within the translated assembly code, and the key instruction block is replaced by the corresponding assembly code.

11. The apparatus for compiling high-level languages of claim 10, further comprising:
   a program feature analysis and profiling tool, for defining at least key instruction block within the translated assembly code and replacing the key instruction block by a plurality of hand-crafted codes.

12. The apparatus for compiling high-level languages of claim 11, wherein the key instruction block is executed by a highly parallel computation core.

13. The apparatus for compiling high-level languages of claim 10, wherein the physical process block is a digital signal processor architecture, and the virtual processor interface is a reduced instruction set computer architecture.

14. The apparatus for compiling high-level languages of claim 13, wherein the compiler is a compiler supporting the reduced instruction set computer architecture.

15. The apparatus for compiling high-level languages of claim 10, further comprising:
   an assembler, linking the compiler and the virtual processor interface, for translating the translated assembly code into a corresponding machine code for the specific processor.

16. The apparatus for compiling high-level languages of claim 15, wherein the assembler is an assembler corresponding to the physical process block.

* * * * *